April 7, 1970   D. D. CERNY   3,504,401
EXTRUDING APPARATUS HAVING EASILY REMOVABLE RETAINING
AND ALIGNING APPARATUS
Filed Dec. 28, 1967

INVENTOR.
DARYL D. CERNY
BY
Campbell, Harris & O'Rourke
ATTORNEYS

United States Patent Office 3,504,401
Patented Apr. 7, 1970

3,504,401
EXTRUDING APPARATUS HAVING EASILY
REMOVABLE RETAINING AND ALIGNING
APPARATUS
Daryl D. Cerny, Greenville, Ohio, assignor to Ball
Brothers Company, Incorporated, Muncie, Ind., a
corporation of Indiana
Filed Dec. 28, 1967, Ser. No. 694,240
Int. Cl. B29f 3/00
U.S. Cl. 18—13                                    5 Claims

ABSTRACT OF THE DISCLOSURE

Extruding apparatus having a die cylinder retaining assembly utilized to relieve residual high pressure tending to lock the die cylinder about a mandrel and within a housing, the pressure relief thereby permitting the apparatus to be easily disassembled in a short period of time. The die cylinder retaining assembly is further capable of being easily moved without special and elaborate tools to achieve alignment adjustment.

BACKGROUND—FIELD OF THE INVENTION

This invention relates generally to extruding apparatus and particularly to an extruding apparatus having easily removable retaining and aligning assembly.

BACKGROUND—PRIOR ART

It is often necessary in the extrusion art, such as in the manufacturing of seamless extruded material in continuous form, to have access within the housing of the forming apparatus, and particularly to those portions of the die cylinder and mandrel within the housing so as to permit maintenance, adjustment of parts, and the like. This is particularly necessary when thermoplastic and elastomeric extruding materials are utilized since portions of these materials often harden and become attached to surface incongruities on the mandrel die cylinder, and/or housing. Further, portions of these materials sometimes harden within the die cylinder even though precautions are taken to deter hardening, such precautions including accurate maintenance of constant and continuous material flow and close temperature regulation.

If, after such precautions, hardening nevertheless occurs, the apparatus must be disassembled for cleaning and removal of the hardened material in order to be assured of further suitable extrusion operation without degraded material.

Disassembly is also required to perform maintenance, such as refitting, machining, and replacing of the parts which are subjected to the high pressure existing within the housing.

Since the down time of the apparatus decreases the efficiency of production, and is a further cause of material hardening within the apparatus, it is advantageous to reduce this down time to a minimum and to disassemble the apparatus in the easiest possible manner. It is also advantageous to provide for fine adjustment of the die cylinder about the mandrel so as to correct for material thickness variations and the like without having to disassemble the apparatus.

Heretofore, the high pressures generated within the housing and therefore against the die cylinder, have presented problems of releasing the die cylinder from the housing in order to disassemble the apparatus or to gain access within the housing. In particular, the high pressures against the die cylinder virtually locked die cylinder retainers threaded directly to the housing. Thus, it has been difficult to disassemble the apparatus or make fine adjustments of the die cylinder position relative to the mandrel and housing.

The apparatus of the present invention solves the aforenoted problems of the prior art and includes a retaining assembly to maintain the die cylinder in position, and which assembly may be easily removed from the housing to thereby minimize down time. Further, the retaining assembly may be finely adjusted during extrusion operation without disassembly of the apparatus.

SUMMARY

The present invention provides an extruder apparatus having an improved die cylinder retaining assembly, which assembly is utilized to relieve the high pressures generated within the apparatus as a prerequisite to removal of the die cylinder. In addition, said retaining assembly permits alignment of the die cylinder when a mandrel is utilized in conjunction therewith.

It is accordingly an object of this invention to provide a novel extruder die cylinder retaining assembly.

It is a further object of this invention to facilitate access to the interior of the housing of an extrusion die cylinder retaining apparatus by providing a die cylinder retaining assembly which may be easily removed.

Another object of the present invention is to provide a screw type assembly to retain the die cylinder of an extrusion apparatus, and which screw type assembly may be utilized to relieve the pressure within the apparatus before removal of the die.

It is a further object of the invention to provide an extrusion die cylinder retaining assembly which may be finely adjusted to position a die cylinder about a mandrel, and which adjustment may be made without disrupting operation of the extruder.

The objects, as stated, and those further objects which may readily appear to those skilled in the art, are not intended to define the scope of the invention. Reference should be had to the claims for such purposes.

DESCRIPTION

Figure 2:
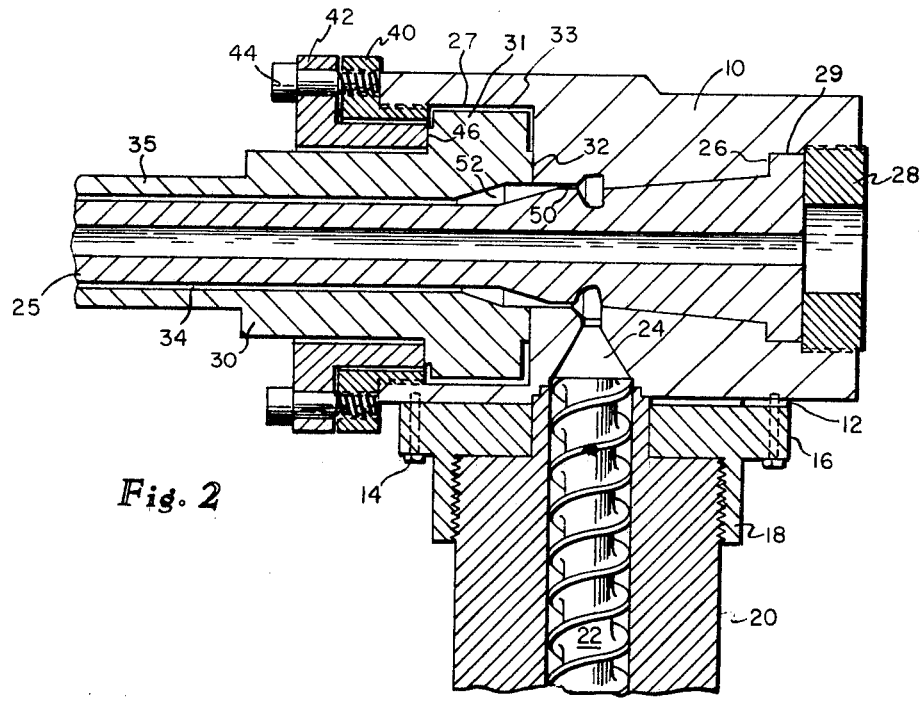
FIGURE 2 is a sectional view of the die cylinder retaining and aligning apparatus taken along the lines 2—2 of FIGURE 1.
Figure 1:
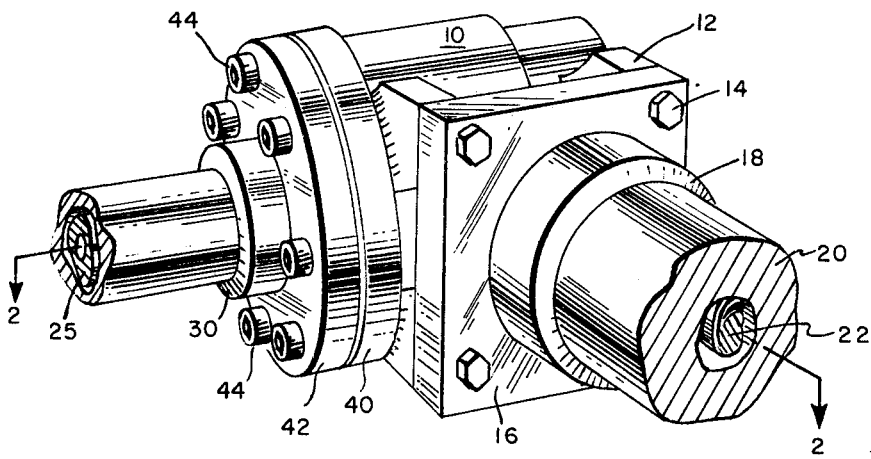
FIGURE 1 is a perspective view of the die cylinder retaining and aligning apparatus fully assembled.

Referring to FIGURES 1 and 2, a generally cylindrical die housing 10 is provided with shoulders 12 extending from the external surface thereof and to which a mounting plate 16 is secured by bolts 14. The mounting plate 16 has an outwardly extending and internally threaded collar 18 to receive and secure an externally threaded end portion of an extruder barrel 20. Extruder barrel 20 is of conventional type and has a worm, or extrusion screw, 22 rotatably mounted in bore, or passageway, 24 of barrel 20. As shown in FIGURE 2, passageway 24 has an inwardly tapering end portion which opens into the hollow central portion of housing 10 so that material is conducted through the passageway 24 by the worm 22 and is then formed into the hollow center portion of the housing 10.

The die housing 10 has a longitudinally extending bore partially of a generally truncated conical configuration with oppositely facing shoulder portions 26 and 32 terminating the conical configuration and generally cylindrical portions 27 and 29 extending outwardly at the end portion of the housing, said cylindrical portion 27 adjacent to shoulder 32 being of greater diameter than the portion 29 adjacent to shoulder 26. A mandrel 25, flanged at one end thereof, is within the housing and mates with the inner conical housing surface. The flanged portion of the mandrel is received in cylindrical portion 29 of the bore and abuts the shoulder 26 with the mandrel being secured within the housing by an externally threaded retaining nut 28 which screws into the end of cylindrical portion 29 which is internally threaded for this purpose. The mandrel 25 is hollow so as to permit the passage of compressed air therethrough from a source (not shown) to prevent collapse of extruded material.

As more particularly shown in FIGURE 2, a die sleeve, or cylinder, 30 is received in cylindrical portion 27 of the housing with annular neck portion 31 abutting the shoulder 32 of the housing. The neck portion 31 of the die cylinder 30 is of slightly smaller diameter than the cavity so as to define a cylindrical chamber 33. Die cylinder 30 has a body portion 35 which circumscribes a portion of the mandrel 25 extending longitudinally from within the housing 10 and has an inner diameter greater than the outer diameter of the mandrel so as to define a cylindrical cavity, or passageway, 34 for longitudinal passage and formation of the material to be extruded.

An externally threaded and flanged hollow retaining nut 40 is threaded into internal threads provided at the end of cylindrical portion 27 of the housing 10. The nut 40 has a series of spaced internally threaded openings therein. A flange sleeve 42, of slightly less diameter than the hollow part of the retaining nut, is received within the hollow part of nut 40. The flanged portion of the sleeve has a series of spaced unthreaded openings corresponding in number and general size to those of the flanged portion of nut 40 and through which externally adjusting screws 44 extend to the openings in the flanged portion of nut 40 to position the sleeve. The end opposite the flanged portion of sleeve 42 abuts against a shoulder 46 which terminates the neck portion of the die cylinder.

OPERATION

To initiate the extruding operation, suitable material such as thermoplastic or elastomeric material in a pliable form is supplied from a source (not shown) and forced by the extrusion screw 22 through passageway 24 in barrel 20 leading to an annular channel about the outer surface of the mandrel 25 and the inner surface of housing 10, as is conventional. As the process is continued, a high pressure is generated within the housing 10 and therefore between the die cylinder 30 and mandrel 25, as is also conventional.

The material forced within the annular channel about the mandrel 25 continues through a narrow annular passageway defined between an annular ring portion 50 of mandrel 25 and the internal surface of housing 10, the narrow annular passageway being provided to condition material forced therethrough to ensure uniform flow and to reduce air bubbles and holes within the material.

The material emerges in continous form into recess 52, which as shown in FIGURE 2, is of larger volume than ring portion 50 or passageway 34 and is formed by angularly positioned opposing walls on the die cylinder and mandrel. After recess 52 becomes filled, the material is forced through passageway 34 between the external surface of the mandrel 25 and the internal surface of the forming die cylinder 30. The mandrel 25 and die cylinder 30 are shown broken away, but are of a length dependent upon the type of material to be extruded in order to provide continuity and thickness uniformity. At the ends (not shown) of the die cylinder 30 and mandrel 25, the extruded pliable material emerges in a continuous cylindrical form. A source (not shown) of compressed air may be attached at the right end of the housing 10 as shown in FIGURE 2 to force air through the hollow mandrel to the extrusion end thereof so as to inhibit collapse of the extruded material, which material may be shaped and processed in any conventional manner.

If alteration of the extruded tubular continuous thermoplastic or elastomeric material is desired, such as could occur if equal surface thickness about the periphery is desired and there is a deviation therefrom, the forming die cylinder 30 positioned about the mandrel 25 may be finely adjusted by turning one or more of the adjusting screws 44 to reposition the die cylinder with respect to the mandrel.

When the extrusion equipment is to be shut down to permit cleaning, maintenance, part replacement, or the like, the forming die cylinder 30 may be easily removed from within the housing 10. Although a high pressure residual remains within housing 10, which pressure forces the forming die cylinder 30 against the retaining sleeve 42 thereby locking the nut 40 within the housing 10, removal may be accomplished by backing off of the retaining and adjusting screws 44 which action permits the retaining sleeve 42 and die cylinder 30 to be forced out of the housing 10 by an amount depending upon the incremental withdrawal or backing off distance of screws 44 up to the point, or limit, where the notched portion of shoulder 46 comes into contact with nut 40 to thus establish the maximum pressure relieving position of the die cylinder, the pressure being thus relieved by enlargement of recess 52 and opening of chamber 33 to recess 52 when the die cylinder moves away from shoulder 32 of the housing 10. The threaded retaining nut 40 may then be easily removed from the housing 10 with the aid of only a light tool.

Although only one embodiment of the invention has been shown and described, various modifications as may appear to those skilled in the art are meant to be within the contemplation of the invention as defined in scope by the claims.

What is claimed is:

1. High pressure extrusion apparatus, comprising: means including a die housing and die sleeve for receiving pliable extruding material and forming extrusions of predetermined configuration therefrom; and a retaining assembly having a first member releasably mounted on said die housing, a second member engaging said first member and movable in opposite predetermined directions with respect thereto, and a third member for releasably fastening said second member in a predetermined position with respect to said first member and in which position said die sleeve is caused to tightly engage said die housing, release of said second member from said predetermined position permitting said die sleeve to be disengaged from said housing to relieve residual pressures therein to thereafter permit said first member to be easily released from said housing for removal of said die sleeve from said housing.

2. The apparatus of claim 1 wherein said first member is a hollow nut and wherein said second member is a sleeve slidably received through the hollow portion of said nut.

3. Extrusion apparatus for receiving and shaping a pliable material under high pressure, the apparatus comprising:
   a mandrel;
   a housing adapted to receive a portion of the mandrel and the pliable material between the said mandrel and housing;
   means for retaining said mandrel in stationary position relative to said housing;
   a die sleeve extending longitudinally about said mandrel, said die sleeve being flanged at an end portion thereof;
   a threaded nut adjustable to said housing;
   a retaining sleeve to position the flanged end portion of said die sleeve against the housing; and
   readily adjustable means for securing said retaining sleeve to said nut, said adjustable securing means being movable relative to said nut and retaining sleeve;
   whereby the die sleeve may be finely adjusted with respect to the mandrel by said adjustable securing means.

4. The apparatus defined by claim 3 wherein said nut has holes extending longitudinally within the wall thereof, and
- said retaining sleeve being flanged and having holes extending longitudinally through the flange thereof; and
- wherein said securing means includes: adjusting screws extending through the holes of said retaining sleeve and threadedly engaging said nut within the holes thereof;
- whereby the position of said die sleeve about said mandrel may be finely adjusted by adjusting the threaded engagement of said screws in said nut.

5. In high pressure extrusion apparatus having a die cylinder extending from a housing, the die cylinder being flanged adjacent the housing, and a hollow mandrel fixed to the housing extending longitudinally within the die cylinder, the combination comprising:
- a nut threadedly engageable to said housing and spaced from the die cylinder flange;
- a flanged retaining sleeve having a flanged portion spaced from said nut and a body portion extending longitudinally within said nut to the die cylinder flange;
- readily adjustable means for securing said flanged retaining sleeve to said nut; said adjustable securing means being movable with respect to said nut and retaining sleeve;
- the securing means being adjustable to vary the angular attitude of the die cylinder so as to finely control the peripheral spacing between said mandrel and die cylinder and to relieve the high pressure within the extrusion apparatus.

References Cited

UNITED STATES PATENTS

| | | | |
|---|---|---|---|
| 1,934,647 | 11/1933 | State et al. | 18—13 |
| 2,501,690 | 3/1950 | Prendergast | 18—13 XR |
| 2,991,504 | 7/1961 | Eppler | 18—13 |
| 3,024,494 | 3/1962 | Szpila | 18—13 |

WILLIAM J. STEPHENSON, Primary Examiner

U.S. Cl. X.R.

18—12, 14